United States Patent [19]

Balle et al.

[11] 4,272,619

[45] Jun. 9, 1981

[54] PROCESS FOR THE PRODUCTION OF MODIFIED POLYETHER POLYOLS AND THEIR USE IN PROCESSES FOR THE PRODUCTION OF POLYURETHANE PLASTICS

[75] Inventors: Gerhard Balle; Hansjürgen Rabe, both of Leverkusen; Peter Vehlewald, Leichlingen, all of Fed. Rep. of Germany

[73] Assignee: Bayer Aktiengesellschaft, Leverkusen, Fed. Rep. of Germany

[21] Appl. No.: 139,901

[22] Filed: Apr. 14, 1980

[30] Foreign Application Priority Data

Apr. 18, 1979 [DE] Fed. Rep. of Germany ....... 2915610

[51] Int. Cl.³ .............................................. C08G 18/14
[52] U.S. Cl. .................................... 521/169; 521/137; 521/174; 525/131; 525/187; 526/209; 528/71; 528/72; 528/75; 528/76; 528/77; 528/392
[58] Field of Search ............. 521/174, 169, 137; 525/131, 187; 526/209; 528/71, 72, 75, 76, 77, 392

[56] References Cited

U.S. PATENT DOCUMENTS

| Re. 28,715 | 2/1976 | Stamberger ................ 260/33.2 R |
|---|---|---|
| Re. 29,118 | 1/1977 | Stamberger ...................... 260/13 |
| 3,304,273 | 2/1967 | Stamberger ...................... 521/137 |
| 3,383,351 | 5/1968 | Stamberger ...................... 521/137 |
| 3,523,093 | 8/1970 | Stamberger . |
| 4,018,851 | 4/1977 | Baccei .................................. 528/76 |
| 4,104,236 | 8/1978 | Simroth ........................ 260/33.2 R |
| 4,111,865 | 9/1978 | Seefried et al. ................... 521/137 |
| 4,119,586 | 10/1978 | Shah ................................ 521/137 |
| 4,125,505 | 11/1978 | Critchfield et al. ........... 260/33.2 R |
| 4,148,840 | 4/1979 | Shah ............................. 260/33.4 R |
| 4,172,825 | 10/1979 | Shook et al. ................. 260/33.2 R |
| 4,198,488 | 4/1980 | Drake et al. ....................... 528/75 |
| 4,208,314 | 6/1980 | Priest et al. ...................... 526/209 |
| 4,226,756 | 10/1980 | Critchfield et al. ............. 526/209 |

FOREIGN PATENT DOCUMENTS 987618 3/1965 United Kingdom .
1040452 8/1966 United Kingdom .

Primary Examiner—Maurice J. Welsh
Attorney, Agent, or Firm—Gene Harsh; Joseph C. Gil

[57] ABSTRACT

The present invention relates to a process for the production of modified polyether polyols by the radical polymerization of a mixture of acrylonitrile, styrene, a salt of an $\alpha,\beta$-unsaturated monocarboxylic or polycarboxylic acid containing a primary, secondary or tertiary monoamine or polyamine and optionally copolymerizable compounds with a polyether polyol.

10 Claims, No Drawings

PROCESS FOR THE PRODUCTION OF MODIFIED POLYETHER POLYOLS AND THEIR USE IN PROCESSES FOR THE PRODUCTION OF POLYURETHANE PLASTICS

BACKGROUND OF THE INVENTION

Polyether polyols modified by polymers or copolymers of olefinically unsaturated monomers, so-called polymer polyols, and their use for the production of polyurethane plastics, particularly foams, are known. They are produced by the polymerization in situ of one or more vinyl monomers in standard polyether polyols. The use of acrylonitrile and mixtures thereof with styrene has acquired the greatest commercial significance, in the presence of a radical-forming polymerization initiator. The production and use of products such as these are described, for example, in U.S. Pat. Nos. 3,304,273; 3,383,351; Re-28715; Re-29118; 3,523,093; 4,104,236; 4,111,865; 4,119,586; 4,125,505; 4,148,840 and 4,172,825; and in German Pat. Nos. 1,222,669; 1,152,536 and 1,152,537.

Polyurethanes produced with polymer polyols of this type are distinguished by an improvement of their properties. In particular, the hardness and load bearing strength of flexible polyurethane foams are favorably influenced. Therefore it is possible to obtain relatively low densities and, thus, to save on starting material for the same level of hardness and tearing strength of previous polyurethanes.

In addition, the polymer polyols provide flexible foams with a greater open-cell character and, in doing so, counteract shrinkage of the fresh foams during storage. Finally, it is possible by means of the polymer polyols, provided that the starting polyether is suitably selected, to produce so-called highly elastic, cold-hardening foams. conventional processes for producing foams such as these, there is no need to use special polyisocyanates with adapted reactivity; instead it is possible to use standard commercial products, particularly the tolylene diisocyanate predominantly used in the production of flexible foams.

Ideally, the polymer polyols are relatively low-viscosity, finely divided, non-sedimenting dispersions of the polymer, preferably an acrylonitrile or acrylonitrile/styrene graft (co) polymer, in the substantially unchanged polyether polyol. Characteristic features of the quality and processibility of the polymer polyols are low viscosity, stability in storage (resistance to sedimentation) and particle size. These properties are influenced primarily by the type of starting materials used and by the quantitative ratios between them. For monomer mixtures of acrylonitrile and styrene, optionally together with small quantities of other comonomers, the optimum properties of the polymer polyol (as low a viscosity as possible; absence of sediment and agglomerate; small particle size), for a given molecular weight of the starting polyether, lies within a relatively narrow range of production parameters. The monomer content of the mixture and the monomer ratio both have a particularly marked influence upon the quality of the end product. Starting out from a polymerization mixture containing pure acrylonitrile, the viscosity, particle size and agglomerate content pass through a minimum with increasing styrene content of the mixture and rise sharply with increasing styrene content beyond this minimum. They also increase drastically with increasing monomer total, based on the starting polyether. However, the abovementioned values also increase with decreasing molecular weight of the starting polyether and also with a reduction in the polymerization temperature to below 100° C.

The polymer polyol dispersions are stabilized against sedimentation by the incorporation of some of the molecules of the starting polyether into the polymer formed in situ. It may be assumed that the reaction conditions influence the grafting frequency so that it is only at the optimum of the parameter range that it is possible to obtain maximum grafting frequency which guarantees the stability in storage and the processibility of the product. If the limits of this range of parameters are exceeded, increased viscosity and coarsening of the particles in the polymer polyol to the point of agglomeration and sedimentation are the inevitable consequences. The use of polyethers having a short chain length, equivalent weight less than 1000, also leads to highly viscous, coarse suspensions.

There is no technical teaching in the existing literature to show how these limitations, to which the process for producing polymer polyols is subject, can be overcome and how the properties of the end product can be improved, even in the case of mixtures which are critical in regard to viscosity and particle size.

It would be desirable for example to obtain a higher solids content, irrespective of the molecular weight of the starting polyether, in order to increase further the property-improving effect of the polymer polyol and to make it possible for the processor to blend the product with other polyols adapting the requirements to the properties of his polyurethane foams. At the same time, however, the processibility of the product should not be adversely affected. In other words neither viscosity nor particle size should be increased too greatly.

It has already been proposed to use standard molecular weight regulators and telogens in the in situ polymerization reaction in order to reduce the viscosity of polymer polyols in critical mixtures. However, this procedure has not yet been successful because these substances, for example the mercaptans normally used for polymerization purposes, compete with the polyether polyol as transfer agents with a high transfer constant and in fact reduce the grafting yield.

Although the quality of the end product can be improved to a certain extent by increasing the concentration of initiator, there are limits to this process. Increased additions of peroxide involve the danger of an oxidative attack on the polyether. This promotes degradation and cross-linking reactions. At the same time, secondary products formed can give rise to core discoloration in the production of foams. A toxic secondary product is formed from azoisobutyronitrile (AIBN), which has been successfully used in practice, so that in this case, too, the concentration of initiator should be kept as low as possible.

New developments in the processing technology of flexible polyurethane foams, particularly in the upholstery and automobile fields, have created a demand for flame laminatability and high frequency ("HF") weldability of flexible polyether-based foams with other materials, particularly textiles. However, commercially available flexible polyether urethane foams cannot be subjected to high-frequency welding. There has been no shortage of attempts to make them suitable for HF-welding by the incorporation of suitable additives, primarily substances having a high dielectric constant.

In particular, it would seem to be desirable to provide the foam manufacturer with ready-formulated starting materials from which HF-weldable foams can be produced without any need for further additives.

Numerous free radical polymerizable, ethylenically unsaturated compounds are described in the existing patent literature as being suitable for the production of polymer polyols. However, apart from the polyether polyols modified by the polymerization of acrylonitrile or styrene/acrylonitrile mixtures, no other products have as yet acquired any commercial significance. This is in spite of the fact that small quantities of other monomers may be combined with styrene and acrylonitrile without the properties of the end product being significantly altered.

In the known Patents, for example German Pat. No. 1,222,669, reference is made to the use of α,β-unsaturated monocarboxylic and polycarboxylic acids, although products on this basis distinguished by particular properties or by improved processibility have not yet been described. In particular, it is not apparent from the existing literature that the presence of α,β-unsaturated carboxylic acids during the polymerization reaction would make it possible for the stability problems referred to above to be solved and the process limits to be extended.

The object of the present invention is to provide a process for the production of polymer polyols which may be applied more universally than those previously known. The process of the invention shows improvements in the size of the monomer content, the monomer ratio and the choice of the starting polyether and, in addition, gives products which may be converted into foams and show outstanding mechanical properties, and may also be HF-welded. The larger number of polyethers which may be converted into polymer polyols by the new process also makes it possible for new fields of application to be opened up for the class of products in question.

DESCRIPTION OF THE INVENTION

The present invention relates to a process for the production of modified polyether polyols by the radical polymerization of
(I) 1 to 60 parts by weight of a mixture of
  (A) 20 to 99.9% by weight of acrylonitrile,
  (B) 0 to 80% by weight of styrene
  (C) 0.1 to 10% by weight of an α,β-unsaturated monocarboxylic or polycarboxylic acid, and
  (D) 0 to 20% by weight of one or more other copolymerizable compounds, the individual quantities adding up to 100% by weight, in
(II) 99 to 40 parts by weight of a polyether polyol, the sum of (I) and (II) adding up to 100 parts by weight, in the presence of a free radical-forming polymerization initiator, which is characterized in that the α,β-unsaturated monocarboxylic or polycarboxylic acid (C) is used in the form of a salt with a primary, secondary or tertiary monoamine or polyamine.

The α,β-unsaturated carboxylic acids and polycarboxylic acids used for the polymerization reaction according to the invention may be any known α,β-unsaturated carboxylic acids and polycarboxylic acids. Examples include acrylic and methacrylic acid, crotonic acid, maleic acid, fumaric acid, itaconic acid or citraconic acid, to mention only the commercially most important. It is also possible to use the oligomers obtainable by Michael's addition of acrylic acid on its own which correspond to the formula

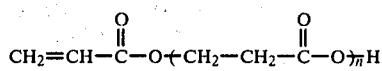

in which n is an integer of from 1 to 5, preferably 1.

Other suitable carboxylic acids are the semiesters and semiamides of α,β-unsaturated dicarboxylic acids, for example monoethyl maleate or fumaric acid-n-butyl amide. The semiesters of saturated dicarboxylic acids with unsaturated alcohols, for example monoallyl succinate or phthalate are also suitable.

The choice of the amine used for salt formation is not critical and, in individual cases, might be limited solely by the poor solubility of the carboxylic acid salt formed in the monomer mixture. Thus, it is possible to use virtually any aliphatic and aromatic monoamine, a polyamine and also heterocyclic bases.

Examples of suitable amines are aliphatic open-chain or cyclic amines and hydroxy amines containing from 1 to 18 carbon atoms per alkyl radical, for example methyl amine, dimethyl amine, trimethyl amine, diethyl amine, triethyl amine, isopropyl amine, isobutyl amine, n-butyl amine, di-n-butyl amine, and tri-n-butyl amine. Ethanolamine, diethanolamine, triethanolamine, N-methyl diethanolamine, N,N-dimethyl ethanolamine, diisopropanolamine, pyrrolidine, piperidine, piperazine, N-2-hydroxy ethyl piperazine, [2,2,2]-diazabicyclo-octane, morpholine, N-methyl morpholine, ethylene diamine and N,N-dimethyl aminopropyl amine are further suitable examples.

Aromatic amines, such an aniline, N-methyl aniline, N,N-dimethyl aniline, N,N-diethyl aniline, N,N-diethyl-p-toluidine, and phenylene diamines, are also suitable.

Heterocyclic nitrogen bases, such as for example pyridine, picolines, quinoline, pyrrole, imidazole, oxazoles, thiazoles, etc., and their substituted derivatives may be used.

The amines which are preferred in the instant invention are the tertiary amines. This is because they interfere least with the urethane-forming reaction. On the other hand it has been found that polymer polyols produced with di-n-butyl amine may be processed without difficulty and that the use of hydroxy amines, such as triethanolamine or methyl diethanolamine, does not adversely affect the processibility of the resulting products either. However, to avoid an excessive content of foreign substances in the product, it is preferred to use monoamines and polyamines having a molecular weight or (in the case of polyamine) equivalent weight of from 30 to 150 and preferably from 56 to 100.

The monomers suitable for the in situ graft polymerization reaction according to the invention are, essentially, acrylonitrile and its mixtures with styrene, the acrylonitrile content of the total monomer mixture amounting to between 20 and 99.9% by weight, preferably to between 25 and 80% by weight and the styrene content amounting to between 0 and 80% by weight and preferably to between 20 and 75% by weight. In addition, it is possible to use small quantities of other copolymerizable comonomers, for example esters of unsaturated monocarboxylic and dicarboxylic acids. Examples of these are acrylic acid, methacrylic acid, maleic acid, fumaric acid or itaconic acid, with lower alcohols containing from 1 to 8 carbon atoms, monoesters or diesters of the above-mentioned carboxylic acids with glycols, polyglycols or higher alcohols. Also suitable are vinyl acetate, vinyl chloride, vinylidene chloride, methacrylonitrile, acrylamide, methacrylamide, esters of the above-mentioned unsaturated carboxylic acids with amino alcohols, for example 2-N,N-dimethyl aminoethyl methacrylate, as well as esters of vinyl phosphonic acid, for example vinyl phosphonic acid dimethyl ester.

Polyether polyols which may be used as starting materials in the instant invention are the addition products known per se of cyclic ethers, such as ethylene oxide, propylene oxide, epichlorohydrin, styrene oxide, 1,2-butylene oxide and/or tetrahydrofuran, with starter compounds containing at least two Zerewitinoff-active hydrogen atoms in the molecule, as described for example in the book "Polyurethanes, Chemistry and Technology", Part I, pages 32 et seq, by J. H. Saunders and K. C. Frisch. Suitable starter compounds are, for example, polyhydroxyl compounds, such as alkylene glycols, glycerol, trimethylol propane, pentaerythritol, sorbitol, glucose, glucosides, sucrose and the polyhydroxyl compounds obtainable by the condensation of formaldehyde (formose and formitol), also water, ammonia, amino alcohols, such as ethanolamine, diethanolamine or triethanolamine, and finally primary and/or secondary amines or polyamines, such as ethylene diamine or aniline. The polyether polyols used as starting materials for the production of the polymer polyols preferably have equivalent weights of from 100 to 3000 and a hydroxyl functionality of from 2 to 8. The polyether chains are normally made up of propylene oxide and ethylene oxide units. The ethylene oxide units may be arranged statistically along the chain or in coherent blocks within and/or at the end of the chain. In the latter case, particularly reactive polyether polyols having a high primary hydroxyl-group content are formed, representing a particularly suitable starting material for the production of the highly elastic cold-hardening flexible foams.

The free radical polymerization reaction may be initiated by the usual radical-forming initiators. In this connection, it is desirable that their decomposition rate should be fairly high, i.e., that the halflife period of thermal decomposition be short enough under the polymerization conditions to ensure that an adequate supply of radicals is always available in the reaction medium. Initiators such as these are, for example, organic peroxides, such as benzoyl peroxide or lauroyl peroxide, and in particular percarboxylic acid esters, such as tert.-butyl peroctoate and tert.-butyl perpivalate, as well as aliphatic azo compounds. Azoisobutyronitrle has the greatest commercial significance and is a particularly suitable initiator for the production of polymer polyols. The initiator is preferably used in a quantity of from 0.3 to 2% by weight, based on the monomer total. The half life period of thermal decomposition at the polymerization temperature should preferably be less than 5 minutes.

The instant process may be carried out either continuously or in batches. For example, a mixture containing the monomer or monomers, the initiator, the $\alpha,\beta$-unsaturated carboxylic acid salt and, optionally, part of the polyether used, may be introduced into the polyether preheated to the polymerization temperature in a stirrer-equipped reactor. An alternative example is a mixture of all the reactants being continuously pumped into a reactor and the product commensurately removed through an overflow. Polymerization may be carried out in the presence or absence of additional solvents. In large-scale operation or in production, it is advisable, because of the possibility of premature initiation of polymerization in the monomer mixture to be added, to only introduce the initiator dissolved in a suitable organic solvent into the monomer stream just before it enters the reaction zone, optionally via a mixing unit. Alternatively, this solution is introduced separately into the reactor.

The temperature at which polymerization is carried out should be at least 100° C. and preferably be in the range of 120° to 140° C. The reaction may be carried out in a system sealed against the external pressure under the pressure which is spontaneously adjusted at the temperature selected or in an open system under ambient pressure. It is necessary to displace the air present from the entire apparatus by purging with an inert gas, such as nitrogen or argon, and to maintain an inert gas atmosphere in the system throughout the entire process. The product is freed from volatile fractions, particularly the residual monomers, in known manner by vacuum distillation, optionally in a thin-layer or falling-film evaporator.

The order in which the individual components are added during preparation of the monomer mixture is not critical, providing the suitable monomer combination has been determined and the solubility of the selected amine salt of the $\alpha,\beta$-unsaturated carboxylic acid confirmed in preliminary tests. It is more favorable to first mix the monomers, in the selected ratio and quantity, together with the $\alpha,\beta$-unsaturated carboxylic acid used, with the starting polyether and then to add the amine, optionally dissolved in an inert organic solvent. The polymerization initiator is best either dissolved in the monomers or, alternatively, it is added to the reaction mixture, for example in solution in an inert organic solvent.

The polymer polyols produced by the instant process are suitable for the production of polyurethane plastics of all kinds, above all flexible and semirigid polyurethane foams, by known processes. They are free from coarse, filterable and sedimenting fractions and have a considerably lower viscosity than the corresponding products produced by conventional processes.

It is also possible by the instant process to produce readily processible, finely divided dispersions of a type which previously could not be obtained free from sediment and agglomerate by known processes or which could only be obtained with such a high viscosity that they could not be processed in the usual mixing and metering units normally used in polyurethane technology. Thus, it is possible to use new starting polyethers or more concentrated products, opening up new fields of application for polymer polyols. One advantage of polymer polyols having higher solids content is that the mechanical properties of polyurethane foams produced therefrom, particularly compression hardness and indentation hardness, can be improved for the same unit weight. The scope available to the processor for blending with other polyethers, cross-linkers, plasticizers and other additives is increased without the solids content falling below a level at which no property-improving effects are observed. In addition, the production of polymer polyols having a high solids content is more economical because the production costs involved are the same as those of known standard products. This allows for making inexpensive and low-viscosity formulations upon re-dilution with pure polyether polyol.

It has surprisingly been found that the polymer polyols produced by the instant process may readily be high-frequency welded with other substrates, for example textiles, without the need for the addition of other substances having a high dielectric constant. This represents a considerable advance in the processing of flexible polyether urethane foams.

The processes for producing polyurethane plastics using polymer polyols and the technical improvements obtainable with them are known per se. Primary importance is attributed to the flexible, elastic and highly elastic foams and also to the semi rigid foams to which the polymer polyols impart improved hardness and bearing strength coupled with a favorable hardness/unit weight relation. Other foam properties, for example the open-cell character and freedom from shrinkage of flexible foams, are also favorably affected. Freedom from agglomerates and as low a viscosity as possible are essential requirements for the machine processing of polymer polyols. Piston pump units impose a viscosity range upper limit of around 1500 to 2000 mPas.

Foaming machines equipped with different types of delivery units, for example gear pumps, are also suitable for use with the instant invention.

The instant invention also relates to a process for the production of optionally cellular polyurethane plastics by reacting (A) polyisocyanates with (B) polyether polyols modified by graft polymerization and, optionally, (C) other relatively high molecular weight and/or low molecular weight compounds containing isocyanate reactive hydrogen atoms, optionally in the presence of (D) blowing agents, catalysts and other additives known per se, which is characterized in that the polymer polyols of the instant invention are used as component B).

The following materials are used for carrying out the process of the instant invention:

1. As starting components, aliphatic, cycloaliphatic, araliphatic, aromatic and heterocyclic polyisocyanates of the type described for example by W. Siefken in Justus Liebigs Annalen der Chemie, 562, pages 75 to 136, for example those corresponding to the formula Q(NCO)$_n$ in which:

n=2-4, preferably 2,
and
Q represents an aliphatic hydrocarbon radical containing from 2 to 36 carbon atoms and preferably from 6 to 10 carbon atoms; a cycloaliphatic hydrocarbon radical containing from 4 to 15 and preferably from 5 to 10 carbon atoms, an aromatic hydrocarbon radical containing from 6 to 15 carbon atoms and preferably from 6 to 13 carbon atoms; or an araliphatic hydrocarbon radical containing from 8 to 15 carbon atoms and preferably from 8 to 13 carbon atoms.

Suitable examples are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional suitable compounds are 1-isocyanato-3,3,5-trimethyl-5-isocyanatomethyl cyclohexane (German Auslegeschrift No. 1,202,785, U.S. Pat. No. 3,401,190); 2,4- and 2,6-hexahydrotolylene diisocyanate and mixtures of these isomers; hexahydro-1,3- and/or -1,4-phenylene diisocyanate; perhydro-2,4'- and/or -4,4,'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate and naphthylene-1,5-diisocyanate.

According to the instant invention, it is also possible for example to use triphenyl methane-4,4',4"-triisocyanate, polyphenyl polymethylene polyisocyanates of the type obtained by condensing aniline with formaldehyde, followed by phosgenation, and described for example in British Patents 874,430 and 848,671; m- and p-isocyanatophenyl sulphonyl isocyanates according to U.S. Pat. No. 3,454,606. Additional examples are perchlorinated aryl polyisocyanates of the type described for example in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162) and in German Offenlegungsschriften Nos. 2,504,400; 2,537,685, and 2,552,350; norbornane diisocyanates according to U.S. Pat. No. 3,492,330; polyisocyanates containing allophanate groups of the type described for example in British Pat. No. 994,890; Belgian Pat. No. 761,626 and Dutch patent application No. 7,102,524. Still more examples of suitable compounds are for example, polyisocyanates containing isocyanurate groups of the type described for example in U.S. Pat. No. 3,001,973; German Pat. Nos. 1,022,789; 1,222,067 and 1,027,394 and German Offenlegungsschriften Nos. 1,929,034 and 2,004,048 as well as polyisocyanates containing urethane groups of the type described for example in Belgian Patent 752,261 or in U.S. Pat. Nos. 3,394,164 and 3,644,457. Polyisocyanates containing acylated urea groups according to German Pat. No. 1,230,778; polyisocyanates containing biuret groups of the type described for example in U.S. Pat. Nos. 3,124,605; 3,201,372 and British Patent 889,050; polyisocyanates produced by telomerization reactions of the type described for example in U.S. Pat. No. 3,654,106 and polyisocyanates containing ester groups of the type described for example in British Pat. Nos. 965,474 and 1,072,956; U.S. Pat. No. 3,567,763 and German Pat. No. 1,231,688 are still more examples of suitable compounds. Reaction products of the above mentioned isocyanates with acetals according to German Pat. No. 1,072,385 and polyisocyanates containing polymeric fatty acid esters according to U.S. Pat. No. 3,455,883 are also suitable compounds for use as starting materials in the instant invention.

It is also possible to use the isocyanate-group-containing distillation residues obtained in the commercial production of isocyanates, optionally in solution in one or more of the above mentioned polyisocyanates. It is also possible to use any mixtures of the above mentioned polyisocyanates.

In general, it is particularly preferred to use the commercially readily available polyisocyanates, for example 2,4- and 2,6-tolylene diisocyanate, and/or any mixtures of these isomers ("TDI"). Polyphenyl polymethylene polyisocyanates of the type obtained by condensing aniline with formaldehyde, followed by phosgenation ("crude MDI") and polyisocyanates containing carbodiimide groups, urethane groups or biuret groups ("modified polyisocyanates"), particularly modified polyisocyanates of the type derived from 2,4- and/or 2,6-tolylene diisocyanate or from 4,4'- and/or 2,4'-diphenyl methane diisocyanate are also particularly preferred.

2. As further optional starting components: compounds containing at least two isocyanate-reactive hydrogen atoms and having a molecular weight of from 400 to 10,000. In addition to compounds containing amino groups, thiol groups or carboxyl groups, preferable compounds contain hydroxyl groups, particularly compounds containing from 2 to 8 hydroxyl groups, above all those which have molecular weights of from 400 to 7000, preferably from 1000 to 5000. Examples of these compounds are polyesters, polyethers, polythioethers, polyacetals, polycarbonates and polyester amides containing at least 2, generally from 2 to 8, but preferably from 2 to 4 hydroxyl groups, of the type known per se for the production of homogeneous and cellular polyurethanes.

Representatives of the above-mentioned compounds which may be used with the instant invention are described for example in High Polymers, Vol. XVI, "Polyurethanes, Chemistry and Technology", by Saunders-Frisch, Interscience Publishers, New York/London, Vol. I, 1962, pages 32-42 and 44-54 and Vol. II, 1964, pages 5-6 and 198-199, and in Kunststoff-Handbuch, Vol. VII, Vieweg-Hochtlen, Carl-Hanser-Verlag, Munich, 1966, for example on pages 45 to 71. It is of course also possible to use mixtures of the above-mentioned compounds containing at least two isocyanate-reactive hydrogen atoms and having a molecular weight of from 400 to 10,000, for example mixtures of polyethers and polyesters.

In some cases, it is particularly advantageous to combine low-melting and high-melting polyhydroxyl compounds with one another as described in German Offenlegungsschrift No. 2,706,297.

3. Compounds containing at least two isocyanate-reactive hydrogen atoms and having a molecular weight of from 32 to 400 may also be used as starting components. These compounds also contain hydroxyl groups and/or amino groups and/or thiol groups and/or carboxyl groups, preferably compounds containing hydroxyl groups and/or amino groups which serve as chain extenders or crosslinkers. These compounds generally contain from 2 to 8 and preferably from 2 to 4 isocyanate-reactive hydrogen atoms.

Here also, it is possible to use mixtures of different compounds containing at least two isocyanate-reactive hydrogen atoms and having a molecular weight of from 32 to 400.

Examples of compounds such as these are ethylene glycol, 1,2- and 1,3-propylene glycol; 1,4- and 2,3-butylene glycol; 1,5-pentane diol; 1,6-hexane diol; 1,8-octane diol; neopentyl glycol; 1,4-bis-hydroxymethyl cyclohexane; 2-methyl-1,3-propane diol; and dibromobutene diol (U.S. Pat. No. 3,723,392). Additional examples of these compounds are glycerol; trimethylol propane; 1,2,6-hexane triol; trimethylol ethane; pentaerythritol; quinitol; mannitol and sorbitol; castor oil; diethylene glycol; triethylene glycol; tetraethylene glycol; higher polyethylene glycols having a molecular weight of up to 400, dipropylene glycol; higher polypropylene glycols having a molecular weight of up to 400; dibutylene glycol; higher polybutylene glycols having a molecular weight of up to 400, 4,4'-dihydroxy diphenyl propane; dihydroxy methyl hydroquinone; ethanolamine; diethanolamine; N-methyl diethanolamine, triethanolamine and 3-aminopropanol.

In the instant invention, suitable low molecular weight polyols are also the mixtures of hydroxyl aldehydes and hydroxy ketones ("formose"), or the polyhydric alcohols obtained therefrom by reduction ("formitol") which are formed in the autocondensation of formaldehyde hydrate in the presence of metal compounds as catalysts and compounds capable of enediol formation as cocatalysts (German Offenlegungsschriften Nos. 2,639,084; 2,714,084; 2,714,104; 2,721,186; 2,738,154 and 3,738,512). In order to obtain plastics with improved flame resistance, these formoses are advantageously used in combination with aminoplast formers and/or phosphites (German Offenlegungsschriften Nos. 2,738,513 and 2,738,532). Solutions of polyisocyanate polyaddition products, particularly solutions of polyurethane ureas containing ionic groups and/or solutions of polyhydrazodicarbonamides, in low molecular weight polyhydric alcohols may also be used as the polyol component in the present invention (German Offenlegungsschrift No. 2,638,759).

Aliphatic diamines suitable for use in the instant invention are, for example, ethylene diamine, 1,4-tetramethylene diamine, 1,11-undecamethylene diamine, 1,12-dodecamethylene diamine and mixtures thereof. Additional examples are 1-amino-3,3,5-trimethyl-5-aminomethyl cyclohexane ("isophorone diamine"), 2,4- and 2,6-hexahydrotolylene diamine and mixtures thereof. Perhydro-2,4'- and -4,4'-diaminodiphenyl methane; p-xylylene diamine; bis-(3-aminopropyl)-methyl-amine; diaminoperhydro anthracenes (German Offenlegungsschrift No. 2,638,731) and cycloaliphatic triamines according to German Offenelgungsschrift No. 2,614,244 are still further examples of suitable aliphatic diamines. It is also possible in the present invention to use hydrazine and substituted hydrazines, for example methyl hydrazine, N,N'-dimethyl hydrazine and their homologs. Acid dihydrazides, for example carbodihydrazide; oxalic acid dihydrazide; the dihydrazides of malonic acid; succinic acid; glutaric acid; adipic acid; β-methyl adipic acid; sebacic acid; hydracrylic acid and terephthalic acid; semicarbazido propionic acid hydrazide (German Offenlegungsschrift No. 1,770,591) are also suitable. Semicarbazido alkylene carbazinic esters such as, for example, 2-semicarbazido ethyl carbazinic ester (German Offenlegungsschrift No. 1,918,504) or even amino-semicarbazide compounds such as, for example, β-aminoethyl semicarbazido carbonate (German Offenlegungsschrift No. 1,902,931) may also be used in the present invention. To control their reactivity, the amino groups may be completely or partly blocked by aldimine or ketimine groups (U.S. Pat. No. 3,734,894; German Offenlegungsschrift No. 2,637,115).

Examples of aromatic diamines are bis-anthranilic acid esters according to German Offenlegungsschriften Nos. 2,040,644 and 2,160,590; 3,5- and 2,4-diaminobenzoic acid esters according to German Offenlegungsschrift No. 2,025,900; the diamines containing ester groups described in German Offenlegungsschriften No. 1,803,635 (U.S. Pat. Nos. 3,681,290 and 3,736,350); 2,040,650 and 2,160,589. The diamines containing ether groups according to German Offenlegungsschriften No. 1,770,525 and 1,809,172 (U.S. Pat. Nos. 3,654,364 and 3,736,295); 2-halogen-1,3-phenylene diamines which may be substituted in the 5-position (German Offenlegungsschriften Nos. 2,001,772; 2,025,896, and 2,065,869); 3,3'-dichloro-4,4'-diaminodiphenyl methane; tolylene diamine; 4,4'-diaminodiphenyl methane; 4,4'-diaminodiphenyl disulfides (German Offenlegungsschrift No. 2,404,976) are further examples of suitable aromatic diamines. Diaminodiphenyl dithioethers (German Offenlegungsschrift No. 2,509,404); aromatic diamines substituted by alkyl thio groups (German Offenlegungsschrift No. 2,638,760); diaminobenzene phosphonic acid esters (German Offenlegungsschrift No. 2,459,491); aromatic diamines containing sulfonate or carboxylate groups (German Offenlegungsschrift No. 2,720,166) and the high-melting diamines described in German Offenlegungsschrift No. 2,635,400 are further examples. Examples of aliphatic-aromatic diamines are the aminoalkyl thioanilines according to German Offenlegungsschrift No. 2,734,574.

In the instant invention, other suitable chain extenders are such compounds as 1-mercapto-3-aminopropane, amino acids which may be substituted for example glycine, alanine, valine, serine and lysine and dicarboxylic acids which may be substituted for example succinic acid, adipic acid, phthalic acid, 4-hydroxy phthalic acid and 4-aminophthalic acid.

In addition, isocyanate-monofunctional compounds may be used as so-called chain terminators in proportions of from 0.01 to 10% by weight, based on polyurethane solids. Monofunctional compounds such as these are, for example, monoamines, such as butyl and dibutylamine, octylamine, stearylamine, N-methyl stearylamine, pyrrolidine, piperidine and cyclohexylamine and monoalcohols such as butanol, 2-ethyl hexanol, octanol, dodecanol, the various amyl alcohols, cyclohexanol, ethylene glycol monoethyl ether.

4. As optional additives and auxiliaries:

Water and/or readily volatile inorganic or organic substances as blowing agents. Organic blowing agents include for example, acetone, ethylacetate, halogen-substituted alkanes, such as methylene chloride, chloroform, ethylidene chloride, vinylidene chloride, monofluorotrichloromethane, chlorodifluoromethane, dichlorodifluoromethane, also butane, hexane, heptane or diethyl ether. Inorganic blowing agents include for example, air, $CO_2$ or $N_2O$. A blowing effect may also be obtained by adding compounds which decompose at temperatures above room temperature giving off gases, such as nitrogen, for example azo compounds such as azodicarbonamide or azoisobutyronitrile. Other examples of blowing agents and information on the use of blowing agents can be found in Kunststoff-Handbuch, Vol. VII, by Vieweg and Hochtlen, Carl-Hanser-Verlag, Munich, 1966, for example on pages 108 and 109, 453 to 455 and 507 to 510.

Catalyts known per se, for example tertiary amines may also be used. Examples of such tertiary amines are triethylamine, tributylamine, N-methyl morpholine, N-ethyl morpholine, N,N,N'N'-tetramethyl ethylene diamine, pentamethyl diethylene triamine and higher homologs (German Offenlegungsschriften Nos. 2,624,527 and 2,624,528); 1,4-diazabicyclo-(2,2,2)-octane; and N-methyl-N'-dimethylaminoethyl piperazine. Bis(dimethyl-aminoalkyl)-piperazines (German Offenlegungsschrift 2,636,787); N,N-dimethyl benzylamine; N,N-dimethyl cyclohexylamine; N,N-diethyl benzylamine; bis(N,N,-diethyl-aminoethyl)-adipate; N,N,N'N'-tetramethyl-1,3-butane diamine; N,N-dimethyl-$\beta$-phenyl ethylamine; 1,2-dimethyl imidazole; 2-methyl imidazole; monocyclic and bicyclic amidines (German Offenlegungsschrift No. 1,720,633) are still further examples of suitable compounds. Bis-(dialkylamino)-alkyl ethers (U.S. Pat. No. 3,330,782, German Auslegeschrift No. 1,030,558 and German Offenlegungsschriften No. 1,804,361 and 2,618,280) and tertiary amines containing amide groups (preferably formamide groups) according to German Offenlegungsschriften Nos. 2,523,633 and 2,732,292 are further examples of suitable compounds. Other suitable catalysts are the Mannich bases known per se of secondary amines, such as dimethylamine, and aldehydes, preferably formaldehyde, or ketones, such as acetone, methylethyl ketone or cyclohexanone, and phenols, such as phenol, nonyl phenol or bisphenol.

Tertiary amines containing isocyanate-reactive hydrogen atoms suitable for use as catalysts are, for example, triethanolamine, triisopropanolamine, N-methyl diethanolamine, N-ethyl diethanolamine, N,N-dimethyl ethanolamine and their reaction products with alkylene oxides, such as propylene oxide and/or ethylene oxide. Also suitable as catalysts are secondary-tertiary amines according to German Offenlegungsschrift No. 2,732,292.

Other suitable catalysts are sila-amines containing carbon-silicon bonds, of the type described for example in German Patent No. 1,229,290 (corresponding to U.S. Pat. No. 3,620,984), for example 2,2,4-trimethyl-2-silamorpholine and 1,3-diethylaminomethyl tetramethyl disiloxane.

Other suitable catalysts are nitrogen-containing bases, such as tetraalkyl ammonium hydroxides, also alkali hydroxides such as sodium hydroxide, alkali phenolates, such as sodium phenolate, or alkali alcoholates, such as sodium methylate. Hexahydrotriazines may also be used as catalysts as described in German Offenlegungsschrift No. 1,769,043.

The reaction between NCO-groups and Zerewitinof-factive hydrogen atoms is also greatly accelerated by lactams and azalactams, an associate between the lactam and the compound containing acid hydrogen initially being formed. Associates such as these and their catalytic effect are described in German Offenlegungsschriften Nos. 2,062,288; 2,062,289; 2,117,576 (U.S. Pat. No. 3,758,444); 2,129,198; 2,330,175 and 2,330,211).

It is also possible to use organometallic compounds, particularly organo tin compounds, as catalysts. In addition to sulfur-containing compounds, such as di-n-octyl tin mercaptide as described in German Auslegeschrift 1,769,367 and U.S. Pat. No. 3,645,927, preferred organo tin compounds are tin (II) salts of carboxylic acids, such as tin (II) acetate, tin (II) octoate, tin (II) ethyl hexoate and tin (II) laurate, and tin (IV) compounds, for example dibutyl tin oxide, dibutyl tin dichloride, dibutyl tin diacetate, dibutyl tin dilaurate, dibutyl tin maleate or dioctyl tin diacetate.

All the above mentioned catalysts may of course be used in the form of mixtures. In this respect, combinations of organometallic compounds and amidines, aminopyridines or hydrazino pyridines as described in German Offenlegungsschriften Nos. 2,343,185; 2,601,082 and 2,603,834 are of particular interest.

Further examples of catalysts suitable for use in the instant invention and information on the way in which they work can be found in Kunststoff-Handbuch by Vieweg and Hochtlen, Vol. VII, Carl-Hanser-Verlag, Munich 1966, for example on pages 96 to 102.

The catalysts are generally used in a quantity of from about 0.001 to 10% by weight, based on the total quantity of compounds containing at least two isocyanate-reactive hydrogen atoms.

Surface-active additives, such as emulsifiers and foam stabilizers may also be used with the instant invention.

Suitable emulsifiers are for example the sodium salts of castor oil sulfonates or salts of fatty acids with amines, such as diethylamine oleate or diethanolamine stearate. Alkali or ammonium salts of sulfonic acids, such as for example dodecyl benzene sulfonic acid or dinaphthyl methane disulfonic acid, or of fatty acids, such as ricinoleic acid, or of polymeric fatty acids may also be used as surface-active additives.

Suitable foam stabilizers are, above all, polyether siloxanes, particularly water soluble types. The structure of these compounds is generally such that a copolymer of ethylene oxide and propylene oxide is attached to a polydimethyl siloxane residue. Foam stabilizers such as these are described for example in U.S. Pat. Nos. 2,834,748; 2,917,480 and 3,629,308. In many cases, polysiloxane-polyoxyalkylene copolymers branched through allophanate groups according to German Offenlegungsschrift 2,558,523 are of particular interest.

Reaction retarders, for example acid-reacting substances such as hydrochloric acid or organic acid halides are suitable for use with the instant invention. Cell regulators known per se, such as paraffins or fatty alcohols or dimethyl polysiloxanes and also pigments or dyes and flameproofing agents known per se, for example tris-chloroethyl phosphate, tricresyl phosphate or ammonium phosphate and polyphosphate are also suitable. Stabilizers against the effects of aging and weather, plasticizers and fungistatic and bacteriostatic substances as well as fillers such as barium sulfate, kieselguhr, carbon black or whiting are examples of other additives which may be used with the instant invention.

Further examples of surface-active additives and foam stabilizers, cell regulators, reaction retarders, stabilizers, flameproofing agents, plasticizers, dyes, fillers, fungistatic and bacteriostatic substances which may be used in the instant invention and information on the way in which these additives are used and on their respective modes of action can be found in Kunststoff-Handbuch by Vieweg and Hochtlen, Vol. VII, Carl-Hanser-Verlag, Munich 1966, for example on pages 103 to 113.

The process of the instant invention is carried out as described below.

The reaction components are reacted by the one-shot process known per se, by the prepolymer process or by the semi-prepolymer process, in many cases using machines, for example of the type described in U.S. Pat. No. 2,764,565. Particulars of processing machines which may also be used can be found in Kunststoff-Handbuch by Vieweg and Hochtlen, Vol. VII, Carl-Hanser-Verlag, Munich, 1966, for example on pages 121 to 205.

In the production of foams, it is also possible to carry out foaming in closed molds. The reaction mixture is introduced into a mold. Suitable mold materials are metals, for example aluminum, or plastics, for example epoxide resin. The foamable reaction mixture foams in the mold and forms the molding. In-mold foaming may be carried out in such a way that the molding has a cellular structure at its surface, although it may also be carried out in such a way that the molding has a compact skin and a cellular core. It is possible to introduce foamable reaction mixture into the mold in such a quantity that the foam formed just fills the mold. It is also possible to introduce into the mold more foamable reaction mixture than is required for filling the interior of the mold with foam. This particular technique is known as overcharging and is known for example from U.S. Pat. Nos. 3,178,490 and 3,182,104.

In many cases, "external release agents" known per se, such as silicone oils, are used for in-mold foaming. It is also possible to use so-called "internal release agents", which may be used in admixture with external release agents, of the type known for example from German Offenlegungsschriften No. 2,121,670 and 2,307,589.

It is also possible to produce cold-hardening foams (cf. British Pat. No. 1,162,517 and German Offenlegungsschrift No. 2,153,086).

It is of course also possible to produce foams by block foaming or by the laminator process known per se.

The instant process is illustrated, but in no way restricted, by the following Examples in which the quantities quoted represent parts by weight or percentages by weight, unless otherwise stated.

The following abbreviations and designations are used in the following Examples:

AIBN: Azoisobutyronitrile (radical polymerization initiator)
AS: Acrylic acid
DAS: Dimeric acrylic acid $CH_2=CH-CO-O-(CH_2)_2-COOH$
MAS: Methacrylic acid
MAS: Maleic acid anhydride
ITS: Itaconic acid
TEA: Triethyl amine
DBA: Di-n-butyl amine
TELA: Triethanolamine
MDELA: Methyl diethanolamine
DMA: N,N-dimethyl aniline
Polyol A: A trimethylol-propane-started polypropylene oxide polyether containing terminal polyoxyethylene blocks and having an ethylene oxide content of 17% and a molecular weight of approximately 4800.
Polyol B: A trimethylol-propane-started polypropylene oxide having a molecular weight of approximately 3000.
Polyol C: A glycerol-started polypropylene oxide polyether containing terminal polyoxyethylene blocks (5%) and having a molecular weight of approximately 3000.
Polyol D: A polypropylene glycol having a molecular weight of approximately 2000.
Polyol E: A polypropylene glycol containing 5% of terminal polyoxyethylene blocks and having a molecular weight of approximately 2000.
Polyol F: A polypropylene glycol having a molecular weight of approximately 1000.
Polyol G: A propoxylated trimethylol propane having a molecular weight of approximately 300.
Polyol H: A trimethylol-propane-started polypropylene oxide polyether containing 13% of terminally incorporated polyoxyethylene blocks and having a molecular weight of approximately 6000.

The viscosities were determined at room temperature (22°–23° C.) using a Haake-Viskotester (VT 02; No. spindle). In order to determine the non-filterable component, the product was filtered through a metal sieve (mesh width 100 μm), the sieve residue was washed with methanol, dried and weighed out; the quantities observed are based on the total solids.

EXAMPLES

EXAMPLE 1

100 g of polyol A were heated to 120° C. in a reaction vessel equipped with a blade stirrer, reflux condenser, thermometer, gas inlet pipe and dropping funnel and heated by an oil bath. A mixture of 500 g of polyol A, 140 g of styrene, 240 g of acrylonitrile, 20 g of DAS, 20.7 g of TELA and 4 g of AIBN (1%, based on the total amount of monomer) was introduced through the dropping funnel over a period of two hours. On completion of the addition, the mixture was heated with stirring for 4 hours and, finally, the volatile fraction was distilled off in vacuo, leaving a pale yellowish, finely divided dispersion free from agglomerate particles and sediment and having a viscosity of 4100 mPas at 22° C. The hydroxyl number amounted to 31.9, the acid number to 2.1 and the quantity of distillate to 32 g. According to a gas chromatogram, the distillate consisted of acrylonitrile and styrene and contained traces of TELA. The analytical data show a monomer conversion of 92% and a solids content of the dispersion of 38%.

For comparison, the test was repeated using DAS itself rather than its amine salt as comonomer. For otherwise the same procedure, a highly viscous, gritty paste was formed. It had a viscosity of 55,000 mPas at 22° C. and was unsuitable for further processing into polyurethane plastics.

EXAMPLE 2

Under the same conditions as in Example 1, a mixture of 3000 g of polyol A, 1125 g of styrene, 1800 g of acrylonitrile, 75 g of AS, 134 g of DBA and 30 g of AIBN was added dropwise over a period of 5 hours at 120° C. to 1500 g of polyol A, after which the reaction mixture was stirred for 3 hours at 120° C. Vacuum distillation gave 249 g of distillate, the product was a white, yellow-tinged homogeneously finely divided dispersion having a viscosity of 4600 mPas/23° C., a hydroxyl number of 22.2, an acid number of 1.6 and a solids content of 39.1%.

The test was repeated in a 100 liter stainless steel autoclave using a batch increased by a factor of 10, 3000 g of toluene being added to the mixture introduced in order to reduce its viscosity. The product had a solids content of 39.2%, a viscosity of 4700 mPas, a hydroxyl number of 19.3 and an acid number of 2.4. The test could be carried out without difficulty on an even larger scale.

A trial run was carried out in a 500 l stainless steel steam heated kettle, 427 kg of a polymer polyol having an OH number of 20.8, an acid number of 1.4, and a viscosity of 5200 m Pa.s at 20° C. are obtained, which was free from sedimenting particles and passed through a 100 μm sieve without leaving a residue.

EXAMPLE 3

The procedure was as in Example 1. The following mixture was added dropwise over a period of 2 hours at 120° C. to 100 g of polyol A:

| Polyol A | 500 g |
| Styrene | 150 g |
| Acrylonitrile | 240 g |
| MAS | 12 g |
| TELA | 20.7 g |
| AIBN | 4 g |
| Distillate | 32 g |
| Solids content | 38.1% |
| Monomer conversion | 92% |
| Viscosity | 4200 mPas/23° C. |
| OH number | 33.9 |
| Acid number | 2.1 |

This batch was increased by a factor of 67.5 and the test repeated in a 100 liter fine-steel autoclave in the same way as in Example 2. The product was a finely divided, stable dispersion having a solids content of 39.5%, a hydroxyl number of 37.2, an acid number of 2.4 and a viscosity of 6000 mPas. The test was repeated in a 500 l stirred reactor yielding a dispersion with an OH-number of 42.3, an acid number of 0,85, and a viscosity of 7800 m Pa.s/20° C. It passed through a 100 μm sieve without leaving a residue.

EXAMPLE 4

300 g of polyol A were heated to 120° C. and the following mixture added over a period of 2 hours:

| Polyol A | 1800 g |
| Styrene | 360 g |
| Acrylonitrile | 530 g |
| DAS | 10 g |
| TELA | 10 g |
| AIBN | 9 g |

A total of 55.5 g of volatile fractions was distilled in vacuo. This corresponds to a conversion of 94% of the monomers used and to a solids content of 28.7%. A very finely divided dispersion having a viscosity of 3700 mPas/22° C. was formed.

EXAMPLE 5

This Example shows that the effect of the reduction in viscosity occurs even with only partial salt formation of the α,β-unsaturated carboxylic acid. In one test, the carboxylic acid used was not neutralized at all; in another test, it was only 50% neutralized with the amine. The procedure was as in Example 1.

| Test | I | II |
|---|---|---|
| Product initially introduced: Polyol A (heated under nitrogen to 120° C.) | 100 g | 100 g |
| Mixture introduced: | | |
| Polyol A | 500 g | 500 g |
| Styrene | 156 g | 156 g |
| Acrylonitrile | 240 g | 140 g |
| AS | 4 g | 4 g |
| TELA | — | 4.1 g |
| Toluene | 200 g | 200 g |
| AIBN | 4 g | 4 g |
| Monomer conversion: | 95.5% | 98.8% |
| Solids content: | 38.9% | 39.7% |
| Viscosity at 23° C.: | 18,000 mPas | 3900 mPas |
| Appearance | (I) generally finely divided dispersion permeated by coarse agglomerate particles | |
| | (II) finely divided, agglomerate-free and sediment-free dispersion | |

EXAMPLES 6 to 19

The following tests were carried out in a two liter capacity glass apparatus of the type described in Example 1. The quantities by weight are given in g. The reaction temperature was 120° C. in every case.

| Example No. | 6 | 7 | 8 | 9 | 10 | 11 | 12 | 13 |
|---|---|---|---|---|---|---|---|---|
| Product initially introduced | | | | | | | | |

-continued

| Example No. | 6 | 7 | 8 | 9 | 10 | 11 | 12 | 13 |
|---|---|---|---|---|---|---|---|---|
| (in grams) | | | | | | | | |
| Polyol A | 200 | 200 | 200 | 200 | 200 | 100 | 100 | 100 |
| Toluene | 25 | 25 | 25 | 25 | 25 | 25 | 25 | 25 |
| Mixture introduced: | | | | | | | | |
| Polyol A | 400 | 400 | 400 | 400 | 400 | 400 | 400 | 300 |
| Toluene | 50 | 50 | 50 | 50 | 50 | 50 | 50 | 50 |
| Acrylonitrile | 240 | 240 | 240 | 200 | 200 | 375 | 300 | 360 |
| Styrene | 150 | 150 | 155 | 190 | 185 | 100 | 190 | 220 |
| AS | 10 | — | — | — | — | — | 10 | — |
| MAS | — | — | 5 | — | 15 | — | — | 20 |
| DAS | — | — | — | 10 | — | 25 | — | — |
| MSA | — | 10 | — | — | — | — | — | — |
| TEA | — | — | 6 | — | — | — | 14 | — |
| DBA | — | — | — | — | 23 | — | — | 30.7 |
| TELA | — | — | — | 10.3 | — | — | — | — |
| MDELA | — | 12.1 | — | — | — | — | — | — |
| DMA | 16.8 | — | — | — | — | — | — | — |
| AIBN | 4 | 4 | 4 | 4 | 4 | 5 | 5 | 6 |

CONTINUATION

| Example No. | 6 | 7 | 8 | 9 | 10 | 11 | 12 | 13 |
|---|---|---|---|---|---|---|---|---|
| Monomer conversion (%) | 95.5 | 97.4 | 96.4 | 96.4 | 95.8 | 94.3 | 95.5 | 93.0 |
| Acrylonitrile bound[1] | 58.5 | 58.6 | 59.2 | 49.1 | 48.7 | 73.8 | 58.7 | 57.9 |
| Styrene Bound[2] | 38.8 | 38.5 | 39.5 | 48.3 | 48.1 | 20.9 | 39.2 | 38.5 |
| GC-anaylsis of the distillate | | | | | | | | |
| % Acrylonitrile | 18.4 | 16.0 | 11.7 | 10.5 | 12.1 | 26.8 | 19.7 | 36.9 |
| % Styrene | 2.3 | 3.4 | 2.9 | 3.7 | 3.9 | 1.5 | 2.9 | 5.1 |
| Solids Content (%) | 38.8 | 38.8 | 38.8 | 39.1 | 38.7 | 48.5 | 48.3 | 58.2 |
| OH-number | 21.4 | 32.3 | 26.3 | 36.9 | 21.2 | 47.3 | 18.0 | 14.3 |
| Non-filterable component (100 μm mesh sieve) | — | — | — | — | — | — | — | —[2] |
| Viscosity (mPas) | 10,000 | 10,000 | 8000 | 6500 | 4300 | 9500 | 13,000 | 21,000 |

[1] %, based on the solids content
[2] after dilution with polyol A in ratio of 1:1

| Example No. | 14 | 15 | 16 | 17 | 18 | 19 |
|---|---|---|---|---|---|---|
| Product initially introduced (in grams) | | | | | | |
| Polyol B | 200 | 200 | 200 | 200 | 200 | 200 |
| Toluene | 25 | 25 | 50 | 50 | 50 | 50 |
| Mixture introduced: | | | | | | |
| Polyol B | 400 | 400 | 400 | 400 | 300 | 200 |
| Toluene | 50 | 50 | 100 | 100 | 100 | 100 |
| Acrylonitrile | 240 | 240 | 240 | 200 | 300 | 360 |
| Styrene | 150 | 145 | 155 | 190 | 190 | 215 |
| AS | 10 | — | — | 10 | — | 25 |
| MAS | — | 15 | — | — | 10 | — |
| ITS | — | — | 5 | — | — | — |
| TEA | 14 | — | 7.8 | — | — | — |
| DBA | — | 22.5 | — | — | — | 44.8 |
| DMA | — | — | — | 16.8 | — | — |
| TELA | — | — | — | — | 17.7 | — |
| AIBN | 4 | 4 | 4 | 4 | 5 | 6 |

| Example No. | 14 | 15 | 16 | 17 | 18 | 19 |
|---|---|---|---|---|---|---|
| Monomer conversion (%) | 93.7 | 94.5 | 93.1 | 95.1 | 97.8 | 95.2 |
| Acrylonitrile bound[1] | 58.2 | 58.9 | 58.0 | 48.4 | 59.7 | 59.0 |
| Styrene bound[1] | 39.1 | 37.1 | 40.7 | 49.0 | 38.3 | 36.6 |
| GC-analysis of the distillate: | | | | | | |
| % Acrylonitrile | 22.0 | 17.4 | 24.3 | 16.1 | 8.2 | 22.9 |
| % Styrene | 3.4 | 4.8 | 3.7 | 3.6 | 2.9 | 6.0 |
| Solids content (%) | 38.4 | 38.6 | 38.3 | 38.8 | 49.4 | 58.8 |
| OH-number | 34.3 | 34.5 | 34.7 | 33.9 | 38.9 | 23.5 |
| Non-filterable component (%, based on solids); 100 μm mesh sieve | — | <0,1 | — | — | — | <0,1 |
| Viscosity (mPas) | 3300 | 2900 | 2900 | 4300 | 4600 | 4900 |

[1] %, based on the solids content

EXAMPLES 20 to 27

The following Examples were carried out under the same conditions as Examples 6-19.

| Example No. | 20 | 21 | 22 | 23 | 24 | 25 | 26 | 27 |
|---|---|---|---|---|---|---|---|---|
| Product initially introduced (in grams): | | | | | | | | |
| Polyol C | 200 | 200 | 200 | 100 | 100 | — | — | — |
| Polyol E | — | — | — | — | — | 100 | 100 | 100 |
| Polyol F | — | — | — | — | — | 100 | 100 | 100 |
| Toluene | 50 | 50 | 50 | 50 | 50 | 50 | 50 | 50 |
| Mixture introduced (in grams): | | | | | | | | |
| Polyol C | 400 | 400 | 400 | 400 | 300 | — | — | — |
| Polyol E | — | — | — | — | — | 300 | 250 | 250 |
| Polyol F | — | — | — | — | — | 300 | 250 | 250 |
| Acrylonitrile | 240 | 240 | 240 | 300 | 360 | 160 | 240 | 240 |
| Styrene | 150 | 145 | 155 | 190 | 215 | 30 | 50 | 50 |
| AS | 10 | — | — | — | 25 | 10 | 10 | 10 |
| MAS | — | 15 | — | 10 | — | — | — | — |
| ITS | — | — | 5 | — | — | — | — | — |
| TELA | — | — | — | 17.7 | — | — | — | 20.7 |
| DBA | — | 22.5 | — | — | 44.8 | — | — | — |
| TEA | 14 | — | 7.8 | — | — | 14 | 14 | — |
| Toluene | 100 | 100 | 100 | 100 | 100 | 100 | 100 | 100 |
| AIBN | 4 | 4 | 4 | 5 | 6 | 2 | 3 | 3 |

| Example No. | 20 | 21 | 22 | 23 | 24 | 25 | 26 | 27 |
|---|---|---|---|---|---|---|---|---|
| Monomer conversion (%) | 98.4 | 94.5 | 94.6 | 97.8 | 95.2 | 95.0 | 96.2 | 97.0 |
| Acrylonitrile bound | 59.9 | 58.6 | 58.3 | 58.2 | 58.9 | 79.3 | 81.0 | 80.2 |

-continued

| Example No. | 20 | 21 | 22 | 23 | 24 | 25 | 26 | 27 |
|---|---|---|---|---|---|---|---|---|
| Styrene bound GC-analysis of the distillate: % | 37.5 | 37.4 | 37.8 | 39.7 | 36.8 | 15.5 | 15.5 | 17.0 |
| Acrylonitrile | 3.0 | 12.8 | 11.8 | 13.6 | 16.1 | 16.3 | 3.9 | 19.0 |
| % Styrene | 1.7 | 3.0 | 1.3 | 1.2 | 3.7 | 1.0 | 3.3 | 1.2 |
| Solids content | 39.6 | 38.5 | 38.7 | 48.6 | 58.7 | 19.2 | 29.2 | 29.4 |
| OH-number | 34.0 | 34.7 | 34.4 | 46.8 | 23.1 | 67.9 | 59.7 | 74.6 |
| Viscosity (mPas) | 3800 | 2300 | 3250 | 8000 | 6000 | 700 | 3800 | 1000 |
| Non-filterable component (%) (100 μm mesh sieve) based on the solids content | — | — | 0.4 | — | — | — | — | — |

EXAMPLE 28

The following polymer polyol dispersion was produced using the procedure described in Example 1:

400 g of polyol D were heated under nitrogen to 125° C. A mixture of 930 g of acrylonitrile, 240 g of styrene, 18 g of AIBN, 1400 g of polyol D, 400 g of toluene, 30 g of AS and 42 g of TEA, produced by mixing the individual components in this order, was added over a period of 3 hours, the temperature being kept constant at 125° C. after an initial rise to 132° C. After stirring for 2 hours at the same temperature, the toluene was distilled off together with the residual monomers in a water jet vacuum at 130° C. The distillate collected in a dry ice trap weighed 438.4 g and, according to analysis by gas chromatography, contained 1.27% of styrene, corresponding to 5.6 g, and 7.7% of acrylonitrile, corresponding to 33.7. This gives a monomer conversion of 96.7% and a solids content of 39.2%. The solid contained 77.2% of bound acrylonitrile and 20.2% of bound styrene. The hydroxyl number amounted to 34.6, the acid number to 1.3 and the viscosity at room temperature to 2850 mPas. The product was a yellowish, uniformly finely divided dispersion free from nonfilterable components.

50 parts of this dispersion were diluted with 50 parts polyol D and the resulting mixture reacted with pure 2,4-diisocyanatotoluene to form a pre-polymer having an NCO content of 3.15%. Hardening was carried out with diethyl tolylene diamine at an NCO/NH$_2$-index of 110. A similar product was prepared with pure polyol D as sole hydroxyl component. The following mechanical properties were determined on test specimens of the two elastomers which had been tempered for 24 hours at 110° C.:

|  |  | Comparison test Polyol D | Polymer polyol according to the invention |
|---|---|---|---|
| Tensile strength | (DIN 53 504) | 9.1 Mpa | 25.1 Mpa |
| Elongation at break | (DIN 53 504) | 400% | 445% |
| Tear propagation resistance | (DIN 53 515) | 16.9 KN/m | 38.5 KN/m |
| Hardness, Shore A | (DIN 53 505) | 77 | 87 |
| Elasticity | (DIN 53 512) | 55% | 52% |

EXAMPLES 28-33

The following tests were carried out by the method described in Example 1. The quantities of the materials used are given in grams. The reaction temperature was 125° C.

| Example No. | 28 | 29 | 30 | 31 | 32 | 33 |
|---|---|---|---|---|---|---|
| Product initially introduced: |  |  |  |  |  |  |
| Polyol A | 70 | 70 | 60 | 60 | 50 | 50 |
| Polyol G | 105 | 105 | 90 | 90 | 75 | 75 |
| Toluene | 25 | 25 | 25 | 25 | 25 | 25 |
| Mixture introduced: |  |  |  |  |  |  |
| Polyol A | 210 | 210 | 180 | 180 | 150 | 150 |
| Polyol G | 315 | 315 | 270 | 270 | 225 | 225 |
| Toluene | 50 | 50 | 50 | 50 | 50 | 50 |
| Acrylonitrile | 140 | 150 | 190 | 200 | 235 | 250 |
| Styrene | 150 | 150 | 200 | 200 | 250 | 250 |
| Methacrylic acid | 10 | — | 10 | — | 15 | — |
| Triethyl amine | 12 | — | 12 | — | 18 | — |
| AIBN | 3 | 3 | 4 | 4 | 5 | 5 |
| Monomer Conversion (%) | 96.2 | 96.9 | 97.1 | 95.9 | 95.5 | 96.8 |
| Acrylonitrile bound | 45.5 | 49.2 | 47.0 | 48.9 | 45.7 | 48.9 |
| Styrene bound[1] | 51.0 | 50.8 | 50.5 | 51.1 | 51.0 | 51.1 |
| Acrylonitrile (distillate) (%) | 12.9 | 13.6 | 11.8 | 14.7 | 12.0 | 13.3 |
| Styrene (distillate) (%) | 4.3 | 4.2 | 6.1 | 4.7 | 4.25 | 2.7 |
| Polymer content (%) | 29.2 | 29.3 | 39.3 | 39.0 | 48.85 | 49.2 |
| Hydroxyl number | 245.8 | 244 | 207.5 | 208.9 | 176 | 175 |
| Non-filterable component (based on solids) - 100μm mesh (%) | — | 14[2] | <0.1[2] | n.d. | <0.1[2] | n.d. |
| Viscosity (mPas) | 3900 | 7000 | 7100 | — | 11800 | — |

[1]based on the polymer content
[2]after 1:1 dilution with toluene
n.d. = not determined The products of Examples 28, 30 and 32 were finely divided and completely or substantially free from relatively coarse agglomerate particles. This was also confirmed by the running of a sample down a clean plate of glass, resulting in the formation of a thin, uniformly translucent, film. Example 29 produced a preparation heavily permeated by agglomerates whilst Examples 31 and 33 produced viscous gritty compositions whose viscosity was estimated at more than 100,000 mPa.s and was not measured.

The products of Examples 28, 30 and 32 were processed in a standard formulation for integral skin rigid foam using commercial diphenyl methane diisocyanate to form mouldings increasing in thickness in steps. No surface voids occurred; the resulting mouldings had a smooth, streak-free surface and were distinguished by improved thermal stability under load and an increased E-modulus.

EXAMPLES 34-38

The following tests were carried out in accordance with Example 1. The reaction temperature was 130° C. in each case.

| Example No. | 34 | 35 | 36 | 37 | 38 |
|---|---|---|---|---|---|
| Product initially introduced: |  |  |  |  |  |
| Polyol D | 200 | 200 | 200 | 100 | 100 |
| Mixture introduced: |  |  |  |  |  |
| Polyol D | 400 | 400 | 400 | 400 | 300 |
| Toluene | 125 | 125 | 125 | 125 | 125 |
| Acrylonitrile | 240 | 240 | 160 | 300 | 360 |

-continued

| Example No. | 34 | 35 | 36 | 37 | 38 |
|---|---|---|---|---|---|
| Styrene | 150 | 145 | 220 | 190 | 215 |
| AS | 10 | — | — | — | 25 |
| MAS | — | 15 | — | — | — |
| MSA | — | — | 20 | 10 | — |
| DMA | — | — | 49.4 | — | — |
| TEA | 14 | — | — | — | — |
| TELA | — | — | — | 30.4 | — |
| DBA | — | 22.5 | — | — | 44.8 |
| AIBN | 4 | 4 | 6 | 5 | 9 |
| Monomer conversion (%) | 94.9 | 96.3 | 97.0 | 95.8 | 96.8 |
| Acrylonitrile bound[1] | 58.5 | 59.2 | 38.8 | 59.2 | 59.4 |
| Styrene bound[1] | 38.8 | 36.9 | 56.0 | 38.7 | 26.3 |
| Acrylonitrile in the distillate (%) | 20.3 | 16.8 | 14.6 | 11.3 | 18.2 |
| Styrene in the distillate (%) | 2.9 | 4.1 | 3.8 | 3.1 | 5.2 |
| Polymer content (%) | 39.6 | 40.2 | 41.8 | 50.4 | 60.4 |
| Hydroxyl number | 33.6 | 33.6 | 32.8 | 46.9 | 22.7 |
| Non-filterable component based on solids - 100μm mesh - (%) after 1:1 dilution with toluene | <0.1 | <0.1 | 1.2 | <0.1 | 0.8 |

EXAMPLE 39

10,000 g of polyol H were initially introduced into a reaction vessel equipped with a stirrer, reflux condenser, gas inlet pipe, temperature sensor and metering unit, after which the air was displaced by nitrogen and the contents of the vessel were heated with stirring under nitrogen to a temperature of 125° C. A mixture of 30,000 g of polyol H, 24,000 g of acrylonitrile, 15,200 g of styrene, 800 g of acrylic acid, 1120 g of triethyl amine, 400 g of AIBN and 4000 g of toluene was then introduced over a period of 7 hours by means of a membrane pump (metering rate approximately 200 ml/minute). On completion of the addition, the mixture was stirred for 4 hours at 125° C. and then stripped at the same temperature under a vacuum of 2 mbar. The distillate was collected in a receiver cooled with dry ice/acetone followed by a cold trap. After 11 hours, stripping was terminated and the product—a pale yellow finely divided dispersion—was drained off still hot through a 100 μm mesh sieve. In order to characterise the product, the following data were determined or calculated from measured values:

| | |
|---|---|
| Quantity of distillate | 5115 g |
| including acrylonitrile | 18.6% |
| styrene | 3.2% |
| acrylic acid | 0.1% |
| triethylamine | traces |
| Monomer conversion | 97.2% |
| Acrylonitrile bound[1] | 57.6% |
| Styrene bound[1] | 37.6% |
| Solids content | 50.0% |
| Sieve residue[1] | 0.03% |
| Hydroxyl number/acid number | 14.3/1.7 |
| Viscosity at 24° C. | 11,800 mPa.s |

[1]based on total solids content

EXAMPLES 40–43

The following formulations were foamed in a Hennecke type UBT 78 high-pressure foaming maching. Polyol I is a polyether triol of polyoxypropylene and terminal polyoxyethylene sequences, started with trimethylol propane, which contains 13% of ethylene oxide and has a molecular weight of 4800 and a hydroxyl number of 35. The two polymer polyols used were produced semi-continuously in a 400-liter-capacity stirrer-equipped vessel in accordance with Examples 4 and 5 and corresponded in all their analytical data to the products obtained in those Examples. The quantities are quoted in parts by weight.

| Example No. | 40 | 41 | 42 | 43 |
|---|---|---|---|---|
| Polymer polyol of Example 2 | 100 | 50 | — | — |
| Polymer polyol of Example 3 | — | — | 100 | 50 |
| Polyol I | — | 50 | — | 50 |
| Water | 4.0 | 4.0 | 4.0 | 4.0 |
| Polysiloxane stabiliser | 1.2 | 1.2 | 1.2 | 1.2 |
| Triet-ylene diamine | 0.05 | 0.05 | 0.05 | 0.05 |
| Dimethyl ethanolamine | 0.2 | 0.2 | 0.2 | 0.2 |
| Tin dioctoate | 0.3 | 0.3 | 0.3 | 0.3 |
| Tolylene diisocyanate containing 80% by weight of the 2,4-isomer | 24.5 | 24.2 | 22.8 | 23.4 |
| Tolylene diisocyanate containing 65% by weight of the 2,4-isomer | 24.5 | 24.2 | 22.8 | 23.4 |
| NCO/OH index | 105 | 105 | 105 | 105 |
| Polyol input (kg./min.) | 26 | 28 | 26 | 28 |
| Rise time (sec.) | 60 | 60 | 55 | 65 |
| Gel time (sec.) | 200 | 155 | 180 | 105 |
| Testing of the mechanical properties produced the following values: | | | | |
| Unit weight (kg/M$^3$) DIN 53 420 | 26 | 27 | 25 | 26 |
| Tensile strength (kPa) DIN 53 571 | 115 | 100 | 120 | 95 |
| Breaking elongation (%) DIN 53 571 | 120 | 155 | 80 | 120 |
| Compression hardness at 40% deformation (kPa) DIN 53 577 | 7.1 | 4.4 | 11.0 | 5.8 |

The approximately 2 m long and 1 m wide foam blocks were free from faults such as, for example, base bubbles, cracks or voids. During ageing in the absence of heat and moisture, no above-average deterioration in properties was observed. All the foams readily lend themselves to high-frequency welding to polyamide fabric.

EXAMPLE 44

A highly elastic foam was produced in accordance with the following formulation in the foaming machine mentioned in the preceding Examples:

| | |
|---|---|
| Polymer polyol of Example 4 | 50 parts by weight |
| Polyol I | 50 parts by weight |
| Water | 4.0 parts by weight |
| Triethylene diamine | 0.2 parts by weight |
| Tin dioctoate | 0.4 parts by weight |
| Silicone stabiliser | 0.8 parts by weight |
| Diethanolamine | 1.5 parts by weight |
| Tris-2-chloroethyl phosphate | 2.0 parts by weight |
| Tolylene diisocyanate containing 80% by weight of the 2,4-isomer | 50.6 parts by weight |
| NCO/OH index | 105 |
| Input of polyol | 28 kg./min. |
| Rise time | 49 secs. |
| The following mechanical properties were determined on the foam: | |
| Unit weight | 26 kg/m$^3$ |
| Tensile strength | 115 kPa |
| Breaking elongation | 115% |
| Compression hardness at 40% deformation | 4.1 kPa |

This foam could also be effectively high-frequency welded to polyamide fabric.

EXAMPLE 45

Mouldings of integral rigid foam were produced in a Hennecke type HK 100 high-pressure foaming machine using a plate mould measuring 900 mm long×450 mm wide×10 mm thick. The following formulations were foamed (quantities in parts by weight):

|  | A | B | C |
|---|---|---|---|
| Polymer polyol of Example 13 | 60 | 60 | — |
| Commercial polyol (solids content 20%) | — | — | 60 |
| Polyol I | 3 | 3 | 3 |
| Ethylene glycol | 25 | 25 | 25 |
| Ethylene diamine/propylene oxide adduct | 1.5 | 1.5 | 1.5 |
| Fatty-acid-based surfactant | 7 | 7 | 7 |
| Silicone stabiliser | 1 | 1 | 1 |
| Organometallic activator | 0.1 | 0.1 | 0.1 |
| Phosphorus-containing flameproofing preparation | 20 | 30 | 20 |
| Trichloromonofluoromethane | 8 | 8 | 8 |

The isocyanate component was a diphenylmethanediisocyanate containing polymeric fractions which had been obtained by distilling off part of the binuclear component from the crude phosgenation product of an aniline-formaldehyde condensate. It was used in quantities corresponding to an NCO/OH index of 110. All of the formulations could be foamed satisfactorily and without difficulty. The mouldings had a smooth, bubble-free surface, free from eddies and flow marks, and a fault-free foamed core. The following mechanical values were determined:

|  | A | B | C |
|---|---|---|---|
| Gross density (g/cc) | 596 | 616 | 623 |
| E-modulus in flexure (mPa) | 1049 | 1012 | 435 |
| Tensile strength (mPa) | 14.3 | 13.1 | 11.7 |
| Breaking elongation (%) | 8 | 6.6 | 17.4 |
| E-modulus in elongation (mPa) | 634 | 607 | 372 |
| Heat distortion temperature (°C.) DIN 53 432 | 96 | 83 | 71 |

These data illustrate the advantages of using polymer polyols having high polymer contents such as can be produced in accordance with the present invention.

EXAMPLES 46 to 55:

The following formulations were foamed in a laboratory mould (aluminium, capacity 4 liters, dimensions 20×20×10 cm). To carry this out, the components of the formulation, other than the isocyanate, were stirred together in a cardboard container using a high-speed blade stirrer (2000 r.p.m.). After 60 seconds, the isocyanate was added and, after stirring for another 10 seconds, the mixture was poured into the mould the cover of which was held down by clips. After a residence time in the mould of 3 to 5 minutes, the mouldings were removed and compressed once to open the cells. The quantities quoted in the Table represent parts by weight.

| Example No. | 46 | 47 | 48 | 49 | 50 | 51 | 52 | 53 | 54 | 55 |
|---|---|---|---|---|---|---|---|---|---|---|
| Polymer of polyol of Example 2 | 25 | — | 25 | — | 37.5 | — | 37.5 | — | 50 | — |
| Polyol H | 75 | 50 | 75 | 50 | 62.5 | 25 | 62.5 | 25 | 50 | — |
| Commercial polymer polyol (solids content 20%) | — | 50 | — | 50 | — | 75 | — | 75 | — | 100 |
| Polymer content of the polyol component | 10 | 10 | 10 | 10 | 15 | 15 | 15 | 15 | 20 | 20 |
| Water | 2.9 | 2.9 | 3.6 | 3.6 | 2.9 | 2.9 | 3.6 | 3.6 | 2.9 | 2.9 |
| Commercial amine activator | 0.72 | 0.72 | 0.82 | 0.82 | 0.72 | 0.72 | 0.82 | 0.82 | 0.72 | 0.72 |
| Commercial organometallic catalyst | 0.02 | 0.02 | 0.02 | 0.02 | 0.02 | 0.02 | 0.02 | 0.02 | 0.02 | 0.02 |
| Commercial polysiloxane stabiliser | 1.1 | 1.1 | 0.9 | 0.9 | 1.1 | 1.1 | 0.9 | 0.9 | 1.1 | 1.1 |
| Polyisocyanate of Example 45 | 35.6 | 35.6 | 44.8 | 44.8 | 35.6 | 35.6 | 44.7 | 44.7 | 35.3 | 35.3 |
| NCO/OH-index | 100 | 100 | 100 | 100 | 100 | 100 | 100 | 100 | 100 | 100 |

The physical values set out in the following Table were determined for the foam mouldings. The different gross densities for the same water contents in the formulation are attributable to different inputs of the foam mixture. In these cases, compression hardness may be compared by standardisation to a single unit weight. The corresponding values are also shown in the Table.

Comparison of the polymer polyol of Example 2 with the commercial polymer polyol for the same amount of polymer in the formation shows that the former is slightly to distinctly superior in its mechanical properties. So far as the optical quality of the mouldings (homogeneity, freedom from edge and internal cracks, cell structure and skin formation) is concerned, no differences were observed.

| Example No. | 46 | 47 | 48 | 49 | 50 | 51 | 52 | 53 | 54 | 55 |
|---|---|---|---|---|---|---|---|---|---|---|
| Gross density (kg/m$^3$) DIN 53 420 | 44 | 42 | 37.5 | 32 | 44 | 40 | 38 | 32 | 43 | 40 |
| Tensile strength (KPa) DIN 53 571 | 190 | 165 | 180 | 155 | 200 | 200 | 215 | 175 | 210 | 200 |
| Breaking elongation (%) | 170 | 155 | 150 | 140 | 160 | 150 | 145 | 125 | 145 | 135 |
| Compression hardness at 40% deformation (KPa) DIN 53 577 | 4.8 | 4.3 | 5.4 | 3.6 | 5.6 | 4.2 | 6.5 | 4.7 | 6.3 | 4.8 |
| Compression set (%) DIN 53 572 |  |  |  |  |  |  |  |  |  |  |
| at 90% compression | 7.6 | — | 9.8 | — | 9.4 | — | 13 | — | 9.7 | — |
| at 50% compression | — | 4.9 | — | 8.2 | — | 6.0 | — | 6.3 | — | 7.3 |

| Example No. | 46 | 47 | 48 | 49 | 50 | 51 | 52 | 53 | 54 | 55 |
|---|---|---|---|---|---|---|---|---|---|---|
| Compression hardness comparison by standardisation to a single unit weight: | | | | | | | | | | |
| unit weight (kg/m³) | 44 | 44 | 37.5 | 37.5 | 44 | 44 | 38 | 38 | 43 | 43 |
| compression hardness (KPa) | 4.8 | 4.7 | 5.4 | 4.7 | 5.6 | 5.0 | 6.5 | 5.9 | 6.3 | 5.4 |

EXAMPLES 56 to 59

The polymer polyol of Example 3, formulated with polyol H to a solids content of 10%, was also compared with the similarly adjusted commercial polymer polyol. The components of the formulation not specified correspond to those in Examples 46 to 55. The quantities are again quoted in parts by weight.

| Example No. | 56 | 57 | 58 | 59 |
|---|---|---|---|---|
| Polymer polyol of Example 3 | 25 | — | 25 | — |
| Polyol H | 75 | 50 | 75 | 50 |
| Commercial polymer polyol | — | 50 | — | 50 |
| Water | 2.9 | 2.9 | 3.6 | 3.6 |
| Polyisocyanate | 36.4 | 36.4 | 45.6 | 45.6 |
| NCO/OH index | 100 | 100 | 100 | 100 |
| Gross density (kg/m³) | 45 | 42 | 35.5 | 32 |
| Tensile strength (KPa) | 205 | 165 | 175 | 155 |
| Breaking elongation (%) | 160 | 155 | 140 | 140 |
| Compression hardness at 40% compression (KPa) | 5.0 | 4.2 | 5.5 | 3.6 |
| Compression hardness for standard unit weight | | | | |
| Unit weight (kg/m³) | 45 | 45 | 35.5 | 35.5 |
| compression hardness (KPa) | 5.0 | 4.8 | 5.5 | 4.3 |

In this test series, too, equally good mouldings were obtained from the polymer polyol according to the invention and the commercial polymer polyol without any foaming problems in either case. Once again, the polymer polyol according to the invention is slightly superior in its mechanical properties.

EXAMPLES 60 to 63

Heat-setting moulded foams were produced in a 4-liter mould in the same way as in the preceding Examples. The following formulations were used (quantities in parts by weight):

| Example No. | 60 | 61 | 62 | 63 |
|---|---|---|---|---|
| Polymer polyol of Example 20 | 25 | — | — | — |
| Polymer polyol of Example 21 | — | 25 | — | — |
| Polymer polyol of Example 24 | — | — | 17 | — |
| Polyol C | 75 | 75 | 93 | 100 |
| Polymer content of polyol (%) | 10 | 10 | 10 | 10 |
| Water | 3.4 | 3.4 | 3.4 | 3.4 |
| Commercial amine activator | 0.2 | 0.2 | 0.2 | 0.2 |
| Tin dioctoate | 0.1 | 0.1 | 0.1 | 0.1 |
| Silicone stabiliser | 1.0 | 1.0 | 1.0 | 1.0 |
| Tolylene diisocyanate containing 80% of the 2,4-isomer | | | | |
| Index | 102 | 102 | 102 | 102 |

Mechanical testing produced the following values:

| Example No. | 60 | 61 | 62 | 63 |
|---|---|---|---|---|
| Unit weight (kg/m³) | 30 | 30 | 30 | 30 |
| Tensile strength (KPa) | 130 | 125 | 120 | 110 |
| Breaking elongation (%) | 180 | 165 | 125 | 180 |
| Compression hardness at 40% compression (KPa) | 4.4 | 4.7 | 5.3 | 3.7 |
| Compression set 90% compression (%) | 4.7 | 5.3 | 6.2 | 3.5 |

All the mouldings had open cells and were free from internal cracks, voids and skin faults.

What is claimed is:

1. A process for the production of modified polyether polyols by the free radical polymerization of
   I. 1 to 60 parts by weight of a mixture of:
   (A) 20 to 99.9% by weight of acrylonitrile,
   (B) 0 to 80% by weight of styrene,
   (C) 0.1 to 10% by weight of an $\alpha,\beta$-unsaturated monocarboxylic or polycarboxylic acid and
   (D) 0 to 20% by weight of one or more other copolymerizable, olefinically unsaturated compounds;
   II. 99 to 40 parts by weight of a polyether polyol, in the presence of a free-radical forming polymerization initiator characterized in that the $\alpha,\beta$-unsaturated monocarboxylic or polycarboxylic acid is used in the form of a salt with a primary, secondary or tertiary monoamine or polyamine.

2. A process as claimed in claim 1, wherein said amines used are selected from the group consisting of aliphatic amines, cycloaliphatic amines, amino alcohols, aromatic amines and heterocyclic nitrogen bases having a molecular weight or an equivalent weight of from 30 to 150.

3. A process as claimed in claim 1, characterized in that the $\alpha,\beta$-unsaturated carboxylic acid (C) used is a compound selected from the group consisting of acrylic acid, methacrylic acid, crotonic acid, oligomers of acrylic acid corresponding to the formula $$CH_2=CH-CO-O-(CH_2-CH_2-CO)_nH$$

in which
n is an integer of from 1 to 5, maleic acid, fumaric acid, itaconic acid, citraconic acid, semiesters or semiamides of $\alpha,\beta$-unsaturated polycarboxylic acids and semiesters or semiamides of saturated polycarboxylic acids with unsaturated, polymerizable alcohols or amines.

4. A process as claimed in claim 1, wherein said copolymerizable monomers (D) used are selected from the group consisting of esters of $\alpha,\beta$-unsaturated monocarboxylic or polycarboxylic acids with monohydric or polyhydric alcohols, vinyl esters, vinyl halides, $\alpha,\beta$-unsaturated nitriles, $\alpha,\beta$-unsaturated amides, aminoalkyl esters of $\alpha,\beta$-unsaturated monocarboxylic or polycarboxylic acids, esters of vinyl phosphonic acid or vinyl aromatic hydrocarbons and mixtures thereof.

5. A process as claimed in claim 1, wherein said radical-forming polymerization initiators used have half life periods of thermal decomposition, at the polymerization temperature, of less than 5 minutes.

6. A process as claimed in claim 1 wherein organic peroxides or aliphatic azo compounds are used as said polymerization initiators.

7. A process as claimed in claim 1, characterized in that azo-bis-isobutyronitrile is used as the polymerization initiator.

8. A process as claimed in claim 1, wherein said polymerization reaction is carried out in the presence of an inert organic solvent, preferably toluene.

9. A process as claimed in claim 1, wherein said polymerization reaction is carried out at temperatures in the range from 100° C. to 140° C.

10. A process for the production of optionally cellular polyurethane plastics by reacting
  (A) polyisocyanates with
  (B) polyether polyols modified by graft polymerization and, optionally
  (C) other relatively high molecular weight and/or low molecular weight compounds containing isocyanate-reactive hydrogen atoms, optionally in the presence of
  (D) blowing agents, catalysts and other additives known per se, characterized in that component (B) comprises a polyether produced by the free radical polymerization of:
(I) 1 to 60 parts by weight of a mixture of;
  (A) 20 to 99.9% by weight of acrylonitrile,
  (B) 0 to 80% by weight of styrene,
  (C) 0.1 to 10% by weight of an $\alpha,\beta$-unsaturated monocarboxylic or polycarboxylic acid and
  (D) 0 to 20% by weight of one or more other co-polymerizable, olefinically unsaturated compounds;
(II) 99 to 40 parts by weight of a polyether polyol; in the presence of a free-radical forming polymerization initiator, wherein the $\alpha,\beta$- unsaturated monocarboxylic or polycarboxylic acid is used in the form of a salt with a primary, secondary or tertiary monoamine or polyamine.

* * * * *